United States Patent Office 3,232,901
Patented Feb. 1, 1966

3,232,901
EPOXY RESIN COMPOSITIONS AND CURED PRODUCTS OBTAINED THEREFROM
Roy T. Holm and Paul H. Williams, Orinda, Calif., assignors to Shell Oil Company, New York, N.Y., a corporation of Delaware
No Drawing. Filed June 4, 1962, Ser. No. 199,636
17 Claims. (Cl. 260—30.4)

This application is a continuation-in-part of our application Serial No. 177,967, filed March 7, 1962, now U.S. 3,116,301.

This invention relates to new epoxy resin compositions. More particularly, the invention relates to epoxy resin compositions having improved fluidity which can be cured to form products having improved physical properties.

Specifically, the invention provides new epoxy resin compositions which have low viscosities and can be cured to form products having excellent resistance to deformation at high temperatures and good resistance to water. The new compositions comprise a mixture of (1) a polyepoxide possessing more than one vic-epoxy group, and preferably a glycidyl ether of a polyhydric phenol, and (2) a compound containing (a) at least one ethylenic group

which is adjacent to a hetero atom, both of which are preferably contained in a cyclic structure, and (b) at least one oxirane, thiirane or aziridine group, which is preferably a terminal oxirane group, such as, for example, glycidyl dihydropyran-2-carboxylate. The invention further provides valuable cured products obtained by reacting the aformentioned compositions with epoxy curing agents such as, for example, polyamines, polycarboxylic acids and anhydrides and metal salts.

Polyepoxides, such as, for example, those obtained by reacting epichlorohydrin with polyhydric phenols in the presence of caustic, are promising materials for use in preparing industrial products as they may be cured to resins which are very hard and durable and have good resistance to chemicals. These resins, however, have certain undesirable properties. These materials, for example, are generally thick liquids or solids and are difficult to utilize in that form for many applications, such as in the preparation of surfacing compositions, castings, impregnating and sealing compositions and the like. It has been proposed to correct this defect by combining the resins with fluid inert diluents, such as dibutyl phthalate, or reactive diluents, such as butyl glycidyl ether. While this type of addition improves the fluidity, it has been found that the resulting cured products have lost many of the desired properties of the initial resin, such as high heat distortion temperatures, good water resistance and fast rate of cure.

It is, therefore, an object of the invention to provide new epoxy resin compositions. It is a further object to provide new epoxy resin compositions which have improved fluidity. It is a further object to provide new epoxy resin compositions having viscosities of say of the order of 5 to 125 poises at 25° C. It is a further object to provide new epoxy resin compositions that can be cured to form products having excellent resistance to deformation at high temperatures. It is a further object to provide new compositions that can be cured to form products having good resistance to water. It is a further object to provide new epoxy resin compositions that have good flexibility. It is a further object to provide new fluid compositions which have long pot life. It is a further object to provide new fluid compositions which are particularly suited for preparation of multi-layer laminates. It is a further object to provide compositions which can be cured with a wide range of proportions of curing agent and can be cured at a faster rate by adding more curing agent. It is a further object to provide cured epoxy resins having improved physical properties. Other objects and advantages of the invention will be apparent from the following detailed description thereof.

It has now been discovered that these and other objects can be accomplished by the compositions of the invention comprising a mixture of (1) a polyepoxide possessing more than one vic-epoxy group, and preferably a glycidyl polyether of a polyhydric phenol and (2) a compound containing (a) at least one ethylenic group

which is adjacent to a hetero atom, both of which are preferably contained in a cyclic structure, and (b) at least one oxirane, thiirane or aziridine group, which is preferably a terminal oxirane group, the compound defined under (2) preferably being present in the composition in an amount of at least one part and preferably not more than 50 parts per weight of the polyepoxide. It has been found that these new compositions have surprisingly low viscosities such as, for example, of the order of 5 to 125 poises at 25° C., and can be poured and otherwise handled as liquids. In addition, the new compositions when combined with epoxy resin, form mixtures having a long pot life as compared to similar compositions without the special component defined under (2) above. It has been further found that the ethylenic group adjacent to the hetero atom is also reactive with curing agents, such as the amine curing agents and thus aids in the cure. Thus, one can add additional curing agent to react not only with the epoxy groups but also the ethylenic group. As noted hereinafter, this provides more leeway for the formulator in addition of the correct amount of curing agent and permits one to speed cure by adding more curing agent. Furthermore, the new compositions are converted on cure to insoluble infusible products having outstanding physical properties. The new cured products, for example, have outstanding heat distortion points and good flexibility and resistance to water. The long pot life, low viscosity and outstanding heat resistance make the new compositions particularly suitable for use in making high temperature multi-laminated products and as high temperature adhesives. Evidence of the superior properties of the new compositions may be found in the working examples at the end of the specification.

The material to be combined with the polyepoxides comprise those compounds containing (1) at least one ethylenic group

which is adjacent to a hetero atom, both of which are preferably contained in a cyclic structure, and (2) at least one oxirane, thiirane or aziridine group which is preferably a terminal oxirane group. By hetero atom is meant a polyvalent atom other than carbon, such as, for example, oxygen, nitrogen, sulfur, phosphorus, arsenic, antimony, tin, lead, silicon, germanium and the like. Cyclic groups which contain both the hetero atom and the ethylenic group include, among others, the tetrahydropyridine, dihydropyran, thiophene, pyrrole, furan, and the like rings and their substituted derivatives, such as, for example, their alkylated and alkoxy-substituted derivatives. "Oxirane" group is a

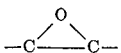

wherein an oxygen atom is connected to each of two adjacent carbon atoms, "thiirane" group is a

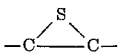

wherein a sulfur atom is connected to each of two adjacent carbon atoms, and "aziridine" group is a

wherein a nitrogen atom is connected to each of two adjacent carbon atoms. The oxirane, thiirane and aziridine groups may be attached to the group containing the ethylenic linkage and hetero atom by an suitable means, such as by carbon, by an ether linkage or linkages, ester linkage or linkages, amide linkage or linkages, imide linkage or linkages, urethane linkage or linkages, and the like and mixtures thereof.

A preferred group of the above-described compounds include those of the formula

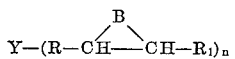

wherein Y is a heterocyclic ring containing an ethylenic group adjacent to an oxygen, nitrogen, sulfur, phosphorus, arsenic, antimony, tin, lead or silicon atom, R and $R_1$ are a hydrocarbon radical or hydrocarbon radical containing one or more ether oxygen, —S—, —SS—, ester, amide, imide, urethane, epoxy or the like linkages or mixtures therof, and B is oxygen, nitrogen or sulfur, and $n$ is an integer of 1 to 3.

Particularly prefered group of the above-described compounds may be exemplified by the following structural formula

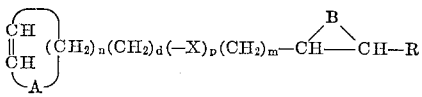

wherein A is oxygen, sulfur, nitrogen, phosphorus, arsenic, antimony, tin, lead, silicon and germanium, B is O, S or N, $n$ is an integer of at least 1, $p$ is 0 or 1, $d$ is 0 to 8, $m$ is 0 or an integer preferably from 1 to 10, X is a member of the group consisting of hydrocarbon radical, ether oxygen atom, ester linkage e.g.,

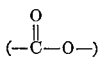

ketone group

sulfide or sulfone linkage, nitrogen atom or amide linkage,

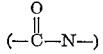

or polyurethane linkage

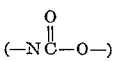

Especially preferred compounds of the above-described group includes those of the formula

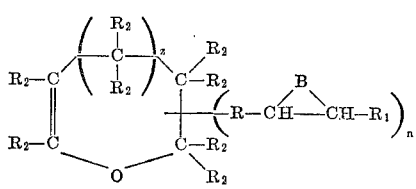

wherein at least one $R_2$ becomes the side chain radical

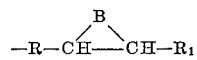

in which radical R and $R_1$ are a hydrocarbon radical or hydrocarbon radical containing one or more ether oxygen, —S—, —SS—, ester, amide, imide, urethane, epoxy or the like linkage or mixtures thereof, B is oxygen, nitrogen or sulfur, $n$ is an integer of 1 to 3, and the remaining $R_2$'s are hydrogen or a hydrocarbon radical, such as an alkyl radical of 1 to 6 carbon atoms, an alkoxy radical which preferably contains from 1 to 4 carbon atoms, or a halogen atom, and preferably chlorine, and $z$ is 0 or 1.

Examples of the above-described compounds include, among others,
glycidyl 3,4-dihydro-1,2-pyran-2-carboxylate;
glycidyl 3,4-dihydrocyclohexyl 3,4-dihydro-1,2-pyran-2-carboxylate;
2,3-epoxycyclohexyl 3,4-dihydro-1,2-pyran-2-carboxylate;
2,3-epoxypropyl 2-methyl-3,4-dihydro-1,2-pyran-2-carboxylate;
2,3-epoxybutyl 3,4-dihydro-1,2-pyran-2-carboxylate;
glycidyl 2,3-dihydro-thiophene-2-carboxylate;
glycidyl 2-methyl-2,3-dihydro-thiophene-2-carboxylate;
glycidyl N-methyl 1,2,3,4-tetrahydropyridine-2-carboxylate;
glycidyl N-methyl 2,3-dihydropyrrole-2-carboxylate;
2,3-epoxycyclohexyl 2-furoate;
glycidyl 2-furoate;
glycidyl pyrrole 2-carboxylate;
glycidyl 2,3-dihydrofuran-2-carboxylate;
2,3-epithiopropyl 2,3-dihydro-thiophene-2-carboxylate;
2,3-epithiopropyl 3,4-dihydro-1,2-pyran-2-carboxylate;
2,3-iminopropyl 3,4-dihydro-1,2-pyran-2-carboxylate;
3,4-epoxy-butyl 3,4-dihydro-1,2-pyran-2-carboxylate;
2,3-epoxyhexyl 3,4-dihydro-1,2-pyran-2carboxylate;
5,6-epoxyoctyl 3,4-dihydro-1,2-pyran-2-carboxylate;
2-ethyl-2,3-epoxyhexyl 3,4-dihydro-1,2-pyran-2-carboxylate;
3,4-epoxydodecyl 3,4-dihydro-1,2-pyran-2-carboxylate;
7,8-epoxyoctadecyl 3,4-dihydro-1,2-pyran-2-carboxylate;
4,5-epoxyamyl 3,4-dihydro-1,2-pyran-2-carboxylate;
3-methyl-3,4-epoxybutyl 3,4-dihydro-1,2-pyran-2-carboxylate and
7,8-epoxyotcyl 3,4-dihydro-1,2-pyran-2-carboxylate.

Another group of the above described compounds include the esters of (a) alcohols containing the ethylenic group and hetero atom (b) oxirane, thiirane and aziridine substituted carboxylic acids. Examples of these esters include, among others, 3,4-dihydro-1,2-pyran-2-methyl 2,3 - epoxypropionate; N-methyl 1,2,3,4 - tetrahydropyri-epoxybutyrate, 2,5 - dimethyl - 3,4 - dihydro - 1,2 - pyran-2-methyl 2,3-epoxypropionate, 2-propyl-5-tertiary butyl 3,4 - dihydro - 1,2 - pyran - 2 - methyl 2,3 - epoxycyclohexane carboxylate; 2,3 - dihydro - thiophene - 2 - methyl 2,3-epoxypropionate; N-methyl 1,2,3,4-tetrahydropyridine-2-butyl 2,3-epoxycyclohexane carboxylate; 3,4-dihydro - 1,2 - pyran - 2 - methyl 2,3 - epithiopropionate; dihydrofuran-2-methyl 2,3-epithiobutanoate; dihydrofuran-2 - butyl 2,3 - iminopropionate; and 2,3 - dihydrothiophene-2-butyl 2,3-epithiocyclohexane carboxylate.

Another group of the above-described compounds include the ethers (1) containing the ethylenic group and hetero atom alcohols containing an oxirane, thiirane or aziridine ring. Examples of these include, among others, 3,4-dihydro-1,2-pyran-2-methyl epoxypropyl ether; 3,4-dihydro-1,2-pyran-2-methyl 2,3-epoxycyclohexyl ether; 2-ethyl - 3,4 - dihydro - 1,2 - pyran - 2 - butyl 3,4 - epoxybutyl ether; 2,5 - dimethyl - 3,4 - dihydro - 1,2 - pyran-2-methyl epoxycyclohexyl methyl ether; 3,4-dihydro-1,2-thiophene-2-methyl 2,3-epithiopropyl ether; 3,4-dihydro-1,2-pyran-2-methyl 2,3-epithiopropyl ether; dihydrofuran-2-methyl 2,3-epithiopropyl ether; and the like.

Another group of the materials that may be used in the compositions of the invention include the amides such as the amides of (1) carboxylic acids containing the ethylenic group and hetero atom and (2) amines containing an oxirane, thiirane or aziridine ring. Examples of these include, among others, N-epoxypropyl-2-methyl 3,4-dihydro-1,2-pyran-2-carboxylic acid amide; N-epoxybutyl-3,4-dihydro-1,2-pyran-2-carboxylic acid amide; N-epithiopropyl 3,4-dihydro-1,2-pyran-2-carboxylic acid amide.

Other examples include compounds of the formulae:

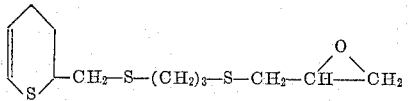

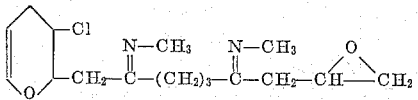

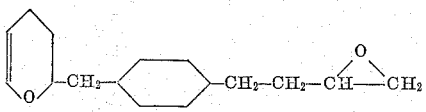

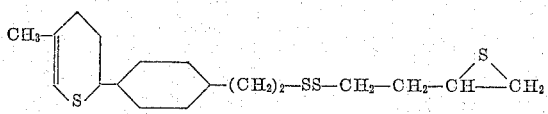

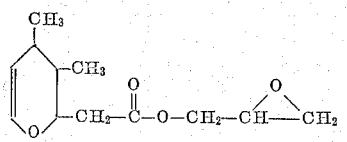

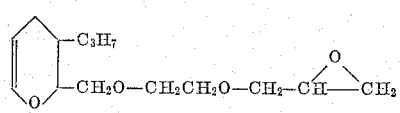

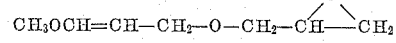

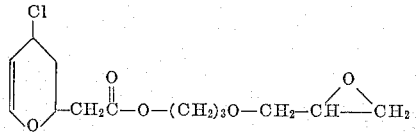

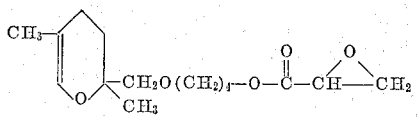

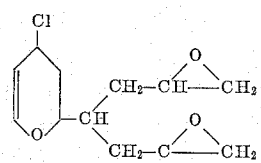

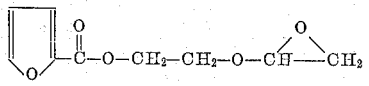

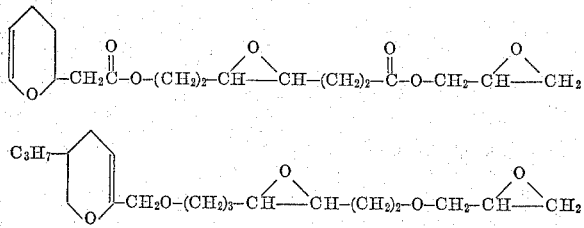

and their corresponding derivatives wherein the oxirane ring or rings are replaced with thiirane rings and aziridine rings.

The above-described compounds can be prepared by a variety of different methods. The esters of the heterocyclic acids and epoxy alcohols can, for example, be prepared by reacting a salt of the acid with an epoxy-substituted halide, preferably in the presence of a salt of a strong base and strong acid such as a quarternary ammonium halide. A detailed description of making some of the above-noted esters may be found in copending patent application Serial No. 177,967, filed March 7, 1962, now U.S. 3,116,301. The ethers can be obtained by reacting the heterocyclic alcohol with an epoxy-substituted halide in the presence of an acid acting catalyst, such as boron trifluoride, and then dehydrochlorinating the resulting product with caustic. The epoxy-substituted amides may be prepared by reacting the amide with epichlorohydrin or related epoxy-substituted halides. Alternative methods involve using an ethylenically unsaturated halide in the above reactions in the place of the epoxy-substituted halide and then epoxidizing the resulting product under control conditions so as to convert the double bond to an epoxy group. The thiirane compounds may be obtained by first forming the corresponding epoxy compound and then reacting the epoxy compound with a thiocyanate such as ammonium thiocyanate or a metal thiocyanate as potassium thiocyanate. Detailed description of this method may be found in patent application 63,961, filed October 21, 1960, now abandoned. The aziridine compounds may be made by preparing the corresponding epoxide and then reacting with ammonia to form the amino alcohol. This is then reacted with sulfuric acid to form the sulfate salt. The internal salt of the sulfate ester of the amino alcohol is then heated to form the aziridine ring.

The polyepoxides to be used in preparing the compositions of the present invention include those compounds possessing more than 1 vic-epoxy group, i.e., a $$-C\overset{O}{\diagup\diagdown}C-$$

group. These polyepoxidies may be saturated or unsaturated, aliphatic, cycloaliphatic, aromatic or heterocyclic and may be substituted if desired with non-interfering substituents, such as halogen atoms, hydroxyl groups, ether radicals, and the like. They may also be monomeric or polymeric.

For clarity, many of the polyepoxidies and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and poly carboxylic acids, such as, for example, di(2,3-epoxybutyl) adipate, di(2,3-epoxybutyl)oxalate, di(2,3-epoxyhexyl) succinate, di(3,4-epoxybutyl)maleate, di(2,3-epoxyoctyl) pimelate, di(2,3-epoxybutyl)phthalate, di-2,3-epoxyoctyl)

tetrahydrophthalate, di(4,5-epoxydodecyl)maleate, di(2,3-epoxybutyl) terephthalate, di(2,3-epoxypentyl)thiodipropionate, di(5,6 - epoxytetradecyl)diphenyldicarboxylate, di(3,4 - epoxyheptyl)sulfonyl-dibutyrate, tri(2,3-epoxybutyl)1,2,4-butanetricarboxylate, di(5,6-epoxypentadecyl)tartarate, di(4,5-epoxytetradecyl)maleate, di(2,3-epoxybutyl)azelate, di(3,4-epoxybutyl)citrate, di(5,6-epoxyoctyl)cyclohexane-1,3-dicarboxylate, di(4,5-epoxyoctadecyl)malonate.

Another group of the epoxy-containing materials include those epoxidized esters of unsaturated alcohols and unsaturated carboxylic acids, such as 2,3-epoxybutyl 3,4-epoxypentanoate; 3,4-epoxyhexyl, 3,4-epoxypentanoate; 3,4-epoxycyclohexyl 3,4-epoxycyclohexanoate; 3,4- epoxycyclohexyl 4,5-epoxyoctanoate; 2,3-epoxycyclohexylmethyl epoxycyclohexane carboxylate.

Still another group of the epoxy-containing materials include epoxidized derivatives of polyethylenically unsaturated polycarboxylic acids such as, for example, dimethyl 8,9,12,13-diepoxyeicosanedioate; dibutyl 7,8,11,12-diepoxyoctadecanedioate; dioctyl 10,11-diethyl-8,9,12,13-diepoxy-eicosanedioate; dihexyl 6,7,10,11-diepoxyhexadecanedioate, didecyl 9-epoxy-ethyl-10,11-epoxyoctadecenedioate; dibutyl 3-butyl-3,4,5,6-diepoxycyclohexane-1,-2-dicarboxylate; dicyclohexyl 3,4,5,6-diepoxycyclohexane-1,2-dicarboxylate; dibenzyl 1,2,4,5-diepoxycyclohexane-1,2-dicarboxylate and diethyl 5,6,10,11-diepoxyoctadecyl succinate.

Still another group comprise the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and polyether B described in above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidyl ether of 1,1,5,5-tetrakis(hydroxyphenyl)pentane (epoxy value 0.514 eq./100 g.) and the like and mixtures thereof.

Other examples of the glycidyl ethers include the glycidyl ethers of novolac resins which resins are obtained by condensing an aldehyde with phenol. A typical member of this class is the epoxy resin from a condensate of formaldehyde and 2,2 - bis(4 - hydroxyphenyl)propane novolac resin.

The glycidyl polyethers of polyhydric phenols obtained by condensing the polyhydric phenols with epichlorohydrin are also referred to as "ethoxylene" resins. See Chemical Week, vol. 69, page 27, for September 8, 1951.

Of particular value in the process of the invention are the polyepoxides containing only carbon, hydrogen, oxygen and halogen atoms.

The compositions of the invention may be prepared by any suitable method. If both of the two components are liquids, the compositions may be simply prepared by mixing the two together. If the polyepoxide is a thick liquid or solid, it is generally preferred to heat the hard material before or during the mixing. Various solvents or diluents which will evaporate before or during cure may be added to assist in the preparation, but the addition of these materials is not generally desirable as it usually lengthens the time of cure of the finished product.

The ratio of the polyepoxide and the special diluent noted above will vary within certain limits depending upon the properties desired in the resulting products. Compositions having desired properties are obtained when the special diluent makes up at least 1% by weight of the mixture, and preferably 5% to 8% by weight of the mixture. Particularly good results are obtained when the special diluent makes up from 10% to 50% and the polyepoxide makes up from 90% to 50% by weight of the combined mixture.

Other materials, such as fillers, dyes, plasticizers, stabilizers and the like may be added as desired along with suitable other resinous materials, such as vinyl resins, tars, pitches, distillate oils, alkyd resins and the like.

The compositions of the invention may be cured by the action of a curing or hardening agent. For this purpose, epoxy curing agents, which may be acidic, neutral or alkaline, are added. Examples of the curing agents include, among others, alkalies like sodium or potassium hydroxide; alkali phenoxides like sodium phenoxide; carboxylic acids or anhydrides, such as phthalic anhydride, tetrahydrophthalic anhydride; dimer or trimer acids derived from unsaturated fatty acids, 1,20-eicosanedioic acid, and the like.

Friedel-Crafts metal halides, such as aluminum chloride, zinc chloride, ferric chloride; salts such as zinc fluoborate, magnesium perchlorate, zinc fluosilicate; phosphoric acid and partial esters thereof including n-butyl ortho-phosphate, diethyl ortho-phosphate and hexaethyltetraphosphate; amino comjounds, such as, for example, diethylene triamine, triethylene tetramine, dicyandiamide, melamine, pyridine, cyclohexylamine, benzyldimethylamine, benzylamine, diethylaniline, triethanolamine, piperidine, tetramethylpiperzine, N,N-dibutyl-1,3-propane diamine, N,N-diethyl-1,3-propane diamine, 1,2-diamino-2-methyl-propane, 2,3-diamino-2-methylbutane, 2,4-diamino-2-methylpentane, 2,4-diamino-2,6-diethyloctane, di-butylamine, dioctylamine, dinonylamine, distearylamine, diallylamine, dicyclohexylamine, methylethylamine, ethylcyclohexylamine, pyrrolidine, 2-methylpyrrolidine, tetrahydropyridine, 2,6-diaminopyridine, meta-phenylene diamine, and the like, and soluble adducts of amines and polyepoxides and their salts, such as described in U.S. 2,651,589 and in U.S. 2,640,037. Also included are the polyamides as isophthalamide, and amino-amides obtained by reacting poly-basic acids with polyamines such as diethylene triamine or p-aminobenzamide.

Preferred curing agents for the epoxy resin compositions of the invention are the polycarboxylic acids and their anhydrides, the primary and secondary aliphatic, cycloaliphatic, aromatic and heterocyclic amines, and preferably the polyamines and adducts of amines and epoxides.

Coming under special consideration are the amine curing agents as they are particularly effective at reacting with the ethylenic group of the above-noted special components combined with the epoxy resins. These include, among others, the aliphatic, cyclo-aliphatic, aromatic and heterocyclic mono- and polyamines, as well as amino-containing materials such as may be obtained by reacting polyamines with alkylene oxides, acrylonitrile, or by reacting polyepoxides with amines and the like, and the amino-containing polyamides obtained by reacting polycarboxylic acids with an amine as described in U.S. 2,450,940 and 2,695,908. Particularly preferred are the aromatic amines.

The amount of the curing agent employed will vary depending upon the type of agent selected. In general, the amount of the curing agent will vary from about 0.5% to 200% by weight of the combined mixture of epoxy ether and epoxy ester. The tertiary amines and BF$_3$ complexes are preferably employed in amounts varying from abotut 0.5% to 20% and the metal salts are preferably employed in amounts varying from about 1% to 15%. The secondary and primary amines, acids and anhydrides are preferably employed in at least .8 equivalent, an equivalent amount being that sufficient to furnish one active hydrogen atom or carboxyl group or anhydride group for every epoxy group including the epoxy group in the new diluent. Such combinations are preferably combined in equivalent ratios (curing agent to epoxy) which vary from about .6:1 to 1.5:1. To obtain superior results, it is also possible to consider the ethylenic group in the new reactive diluent as a center for cure with agents such as the amines, and when considering an equivalent amount of curing agent, additional amounts may be added for reaction at this point. As both equivalent amounts (i.e., one counting only epoxies and the other counting epoxy

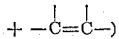

are effective, this gives the formulator more leeway for addition of curing agent and a way to increase speed by increasing the amount of curing agent.

Accelerators or catalysts may be used with any of the above-described curing agents. When one utilizes amine curing agents, it is sometimes desirable to utilize acidic-type accelerators, such as amine hydrochlorides, stannous chloride, ferrous chloride and the like, as well as peroxides as benzoyl peroxide and the like. Such materials are employed in minor amounts, such as, for example, 0.01% to 5% by weight of the curing agent.

The curing of the above-described compositions to form the desired insoluble infusible products may be accomplished by merely mixing the above-noted curing agents in the desired amounts with the compositions of the present invention. The most active curing agents, such as the polyamines as diethylene triamine, are reactive at room temperature and application of heat is not necessary to effect the cure. Other agents, such as the aromatic polyamines are not quite as active at the lower temperatures and it is desirable to apply heat to speed cure. Temperatures employed will vary from about 30° C. to as high as or higher than 250° C.

The compositions of the invention may be utilized for a variety of applications because of their excellent fluidity and improved properties. The compositions are ideally suited for use in preparing coating compositions, impregnating and sealing compositions, foams, pottings, castings, adhesives and the like.

When used for coating compositions, the new compositions of the invention may be used as such or mixed with various additives, such as plasticizers, stabilizers and extenders such as oils, resins, tars, pitches, distillates and the like, and then combined with the desired curing agent. The coatings prepared in this manner may be allowed to set hard at room temperature or heat may be applied to hasten the cure.

The products of the invention may also be used in preparing pottings and castings for electrical apparatus. In actual practice, the compositions are generally combined with the desired curing agent and the mixture poured into the mold or casting containing the electrical apparatus, such as electrical motors and the like, and the mixture allowed to set. Heat may also be applied to hasten cure.

The resinous products may also be employed to prepare valuable foamed products. In this application the resinous products of the invention are preferably combined with the desired curing agents and foaming agents and others, such as thixotropic agents, pigments, stabilizing agents and the like that may be desired. This mixture may be foamed and cured by allowing to stand or by applying heat.

The products of the invention may also be employed to prepare valuable adhesives and impregnating compositions. In utilizing the products for these applications it is generally desirable to combine them with the desired curing agent and any suitable diluent such as acrylonitrile, acetonitrile, crotononitrile, and desired fillers and stabilizers and then apply this mixture to the desired surface. Adhesive compositions prepared in this manner may be used to unite various surfaces such as wood-to-wood, metal-to-metal, resin-to-resin and the like. The adhesives may be allowed to set at room temperature or heat may be applied to hasten the cure.

To illustrate the manner in which the invention may be carried out, the following examples are given. It is understood, however, that the examples are for the purpose of illustration and the invention is not to be regarded as limited to any of the specific conditions cited therein.

*Example I*

This example illustrates the preparation and use of a composition containing a glycidyl polyether of 2,2-bis(4-hydroxy-phenyl)propane and glycidyl 3,4-dihydro - 1,2-pyran-2-carboxylate.

28 parts of glycidyl 3,4-dihydro-1,2-pyran-2-carboxylate was mixed with 72 parts by weight of a glycidyl polyether of 2,2-bis(4-hydroxyphenyl)propane (polyether A noted in U.S. 2,633,458). The resulting mixture was quite fluid and had a viscosity of 8 poises at 25° C. The glycidyl polyether of 2,2-bis(4-hydroxyphenyl)propane had a viscosity of about 180 poises at 25° C.

The pot life of the above mixture in combination with meta-phenylene diamine is indicated in the following experiment. The above-described mixture was combined with 14.15 parts of meta-phenylene diamine (chemical equivalent amount based on equivalency as to epoxy groups). In 8 hours of standing at room temperature, the viscosity had changed from 8 poises to 13 poises at 25° C. In a related sample containing only the glycidyl polyether of 2,2-bis(4-hydroxyphenyl)propane, the viscosity had changed from 180 poises to 1700 poises at 25° C. after 8 hours. This clearly demonstrates the good room temperature stability of the above-noted mixture in combination with amine curing agents.

*Example II*

This example demonstrates the superior properties obtained by curing the mixture containing the glycidyl polyether of 2,2-bis(4-hydroxyphenyl)propane and glycidyl 3,4-dihydro-1,2-pyran-2-carboxylate as prepared in Example I.

The above-noted mixture was combined with 14.15 parts of meta-phenylene diamine (equivalency based on equivalency as to epoxy groups). Sheets were cast and cured as shown in the table. The cured resins had the following properties:

| Viscosity Reducing Additive | Glycidyl 3,4-dihydro-1,2-pyran-2-carboxylate | Glycidyl Butyl Ether |
|---|---|---|
| Percent by wt. in glycidyl polyether | 28 | 10 |
| Curing Agent | (1) | (1) |
| Curing Conditions | (2) | (2) |
| Tensile Properties: | | |
|   Tensile strength (p.s.i.) | 13,600 | 11,600 |
|   Elongation (percent) | 4.93 | 7.36 |
|   Modulus (p.s.i.×10$^5$) | 4.98 | 5.10 |
| Flexibility: | | |
|   Flexing strength (p.s.i.) | 24,600 | 20,880 |
|   Modulus (p.s.i.×10$^5$) | 5.11 | 5.18 |
| Heat Distortion: | | |
|   Temperature, ° C | 156. | 106. |
| Impact Resistance (Izod) (ft./lbs. per inch) | 0.51 | 0.37 |

[1] Meta-phenylene diamine.
[2] 100° C. for 2 hrs. then 150° C. for 4 hrs.

The improvement in heat distortion resistance shown by the epoxyester of the dihydropyran-2-carboxylic acid under cross-linking conditions is outstanding. By extending the cure 20 hours at 150° C. the heat distortion temperature is raised to 182° C. which is much higher than is obtainable with this resin with any other additives.

*Example III*

This example illustrates the use of the composition shown in Example I for the preparation of a multi-layer laminate.

Sheets of 181 type weave glass cloth (Volan A finish) were stacked together with warp to fill thread nested together so as to for a 14 ply laminated structure. The composition was then dried at 90° C. for ½ hour.

The composition shown in Example I made up of 28 parts of glycidyl 3,4-dihydro-1,2-pyran-2-carboxylate and 72 parts of glycidyl polyether of 2,2-bis(4-hydroxphenyl) propane (polyether A in U.S. 2,633,458) with 14.15 parts of meta-phenylene diamine was poured on the top of the above-noted laminated structure, a layer of cellophane placed on top and the cellophane pressed down so as to force the mixture into the laminated structure. The mixture of resin gradually spread throughout the structure. The laminate was then cured for 12 minutes at contact pressure and 100° C. followed by 48 minutes at 110° C. and 25 p.s.i. Strips of the laminate were then post cured for 40 hours at 350° F. A related laminate was prepared from polyether A and meta-phenylene diamine.

The resulting products were tested for strength. The laminate post cured for 40 hours at 350° F. had a strength of 45,000 p.s.i. as compared to 27,700 p.s.i. for a similar product prepared from the glycidyl polyether of 2,2-bis(4-hydroxyphenyl)propane by itself. With the normal post cure, the product prepared by process of the preceding paragraph had a flexural strength of 90,000 to 100,000 p.s.i.

The resulting products were also tested for resistance to water by placing the laminated products in boiling water for 24 hours. The above-noted laminate gained weight of 4.9% after 24 hours soaking while the laminate prepared only from the glycidyl polyether gained 26%. After 65 hours the above-noted laminated product gained weight of 27% as compared to 43% for the laminate prepared from the glycidyl polyether.

*Example IV*

This example illustrates the preparation and use of a composition containing a glycidyl polyether of 2,2-bis(4-hydroxyphenyl)propane and 2-epoxyethyl-3,4-dihydro-1,2-pyran.

15 parts of 1,2-epoxyethyl-3,4-dihydro-1,2-pyran is mixed with 85 parts by weight of a glycidyl polyether of 2,2-bis(4-hydroxyphenyl)propane having an epoxy value of 0.52 and molecular weight of 355. The resulting mixture is quite fluid and has a viscosity of 8 poises at 25° C.

The above mixture is combined with an equivalent amount of meta-phenylene diamine (based on epoxy equivalences) and the mixture cured for 24 hours at 150° C. The resulting product has a heat distortion point of 159° C. as compared to 156° C. for the glycidyl polyether by itself.

*Example V*

This example illustrates the preparation and use of a composition containing a glycidyl polyether and 3,4-dihydro-1,2-pyran-2-methyl glycidyl ether.

30 parts of 3,4-dihydro-1,2-pyran-2-methyl glycidyl ether is combined with 150 parts by weight of a glycidyl polyether of 2,2-bis(4-hydroxyphenyl)propane having an epoxy value of 0.52 eq./100 g. and molecular weight of 355. The resulting mixture is quite fluid and can be easily poured.

The above mixture is combined with an equivalent amount of meta-phenylene diamine and the mixture cured for 4 hours at 150° C. The resulting product is hard, insoluble and infusible and has good resistance to heat and to water. The meta-phenylene diamine product had a heat distortion point of 172° C.

*Example VI*

This example illustrates the preparation and use of a composition containing a glycidyl polyether and 2,3-epithiopropyl 3,4-dihydro-1,2-pyran-2-carboxylate.

25 parts of 2,3-epithiopropyl 3,4-dihydro-1,2-pyran-2-carboxylate is combined with 75 parts of glycidyl polyether of 2,2-bis(4-hydroxyphenyl)propane. The resulting mixture is quite fluid and can be easily poured.

The above mixture is combined with an equivalent amount of meta-phenylene diamine and the mixture cured for 4 hours at 150° C. The resulting product is hard, insoluble, infusible and has good resistance to heat and water.

*Example VII*

Examples I to VI are repeated with the exception that the epoxy resin employed is an epoxidized cyclohexenyl cyclohexene carboxylate. Related results are obtained.

*Example VIII*

Examples I to VI are repeated with the exception that the new compositions are cured with diethylene triamine and with triethylene tetramine. Related results are obtained.

*Example IX*

Examples I to VII are repeated with the exception that the epoxy resin employed is polyether B described in U.S. 2,633,458, the glycidyl ether of 1,1,2,2-tetrakis(4-hydroxyphenyl)ethane having an epoxy value of 0.45 eq./100 g. and melting point of 85° C., and a glycidyl ether of a formaldehyde-phenol resin. Related results are obtained.

*Example X*

This example illustrates the preparation and use of a composition containing a glycidyl polyether and glycidyl dihydrofuran-2-carboxylate.

28 parts of glycidyl dihydrofuran-2-carboxylate are mixed with 72 parts by weight of the glycidyl polyether defined in Example I. The resulting mixture is quite fluid and can be easily poured.

The above mixture is combined with an equivalent amount of meta-phenylene diamine and the mixture cured for 4 hours at 150° C. The resulting product is hard, insoluble, infusible and has good resistance to heat and to water.

*Example XI*

90 parts of the glycidyl polyether shown in Example I was combined with 10 parts of vinyl glycidyl ether. This mixture was cured with 15.6 parts per 100 of resin of meta-phenylene diamine. The product had good hardness and heat resistance. The resin composition was also cured with diethylene triamine to form a hard product.

*Example XII*

Example X was repeated with the exception that the glycidyl dihydrofuran-2-carboxylate was replaced with glycidyl 2-furoate. Related results are obtained.

*Example XIII*

Example I is repeated with the exception that the glycidyl 3,4-dihydro-1,2-pyran-2-carboxylate is replaced by equivalent amounts of each of the following: 2,3-epoxycyclohexyl 3,4-dihydro-1,2-pyran-2-carboxylate; glycidyl 2,3-dihydro-thiophene-2-carboxylate; glycidyl N-methyl 2,3-dihydropyrrole-2-carboxylate; 2,3-epithiopropyl 3,4-dihydro-1,2-pyran-2-carboxylate; 3-methyl-3,4-epoxybutyl 3,4-dihydro-1,2-pyran-2-carboxylate, glycidyl N-methyl 1,2,3,4-tetrahydropyridine-2-carboxylate; 3,4-dihydro-1,2-pyran-2-methyl 2,3-epoxypropionate; 2,3-dihydro-thiophene-2-methyl 2,3-epoxypropionate, 3,4-dihydro-1,2-pyran-2-methyl 2,3-epithiopropionate; 3,4-dihydro-1,2-pyran-2-methyl epoxypropyl ether, 2-ethyl-3,4-dihydro-1,2- pyran-2-butyl epoxybutyl ether 2,3-iminopropyl 3,4-dihydro-1,2-pyran-2-carboxylate and 2,3-iminocyclohexyl N-methyl 2,3-dihydropyrrole-2-carboxylate. Related results are obtained.

*Example XIV*

Example V was repeated with the exception that the pyran compound is replaced with 3,4-dihydro-1,2-pyran-2-methyl 2,3-epithiopropyl ether (B.P. 68° C. at ½ mm.). Related results are obtained.

Compositions shown in Examples I and II are particularly good for use in filament winding as the compositions have good adhesion to glass rovings and the final products have good water resistance and flexibility.

We claim as our invention:

1. A composition consisting essentially of (1) a polyepoxide possessing more than one vic-epoxy group, and (2) a viscosity reducing amount of a compound containing (a) at least one ethylenic group which is adjacent to a hetero atom selected from the group consisting of oxygen, sulfur and nitrogen, and (2) at least one member of the group consisting of oxirane, aziridine and thiirane groups.

2. A composition consisting essentially of (1) a polyepoxide possessing more than one vic-epoxy group, and (2) a viscosity reducing amount of a compound containing (a) at least one ethylenic group which is adjacent to a hetero atom selected from the group consisting of oxygen, sulfur, and nitrogen, said ethylenic group and hetero atom being contained in a cyclic structure having no more than 6 members in the ring, and (b) at least one group

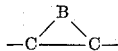

wherein B is a member selected from the group consisting of oxygen, nitrogen, and sulfur.

3. A composition consisting essentially of (1) a polyepoxide possessing more than one vic-epoxy group, and (2) a viscosity reducing amount of a compound of the formula

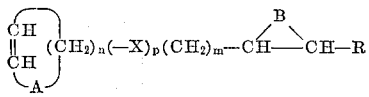

wherein A is a member selected from the group consisting of oxygen, sulfur, and nitrogen, B is a member of the group consisting of oxygen, sulfur and nitrogen, $n$ is an integer from 1 to 3, $m$ is 0 to 10, $p$ is 0 or 1, X is a member selected from the group consisting of hydrocarbon radicals, oxygen atom,

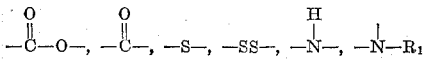

wherein $R_1$ is hydrocarbon radical linkages, and R is a member selected from the group consisting of hydrogen and hydrocarbon radicals.

4. A composition consisting essentially of (1) a polyepoxide possessing more than one vic-epoxy group and (2) a viscosity reducing amount of a compound containing at least one ether oxygen atom attached to an ethylenic double bond C=C and at least one vic-epoxy group.

5. A composition consisting essentially of (1) a glycidyl polyether of a polyhydric compound selected from the group consisting of polyhydric phenols and polyhydric alcohols and (2) a viscosity reducing amount of a liquid compound containing an ether oxygen atom attached to an ethylenic double bond C=C contained in a cyclic structure having no more than 6 members in the ring and a vic-epoxy alkyl group.

6. A composition as in claim 5 wherein the liquid compound containing the cyclic structure is an epoxy alkyl ester of a dihydro-pyran-carboxylic acid.

7. A composition as in claim 5 wherein the liquid compound containing the cyclic structure is an ester of a dihydro-pyranalkanol and an epoxy substituted carboxylic acid.

8. A composition as in claim 5 wherein the liquid material containing the cyclic structure is an ether of a dihydro-pyranalkanol and an epoxy substituted alcohol.

9. The composition as in claim 5 wherein the glycidyl polyether is a glycidyl polyether of 2,2-bis(4-hydroxyphenyl)propane having a molecular weight between 200 and 4,000.

10. A composition consisting essentially of (1) 99 parts to 50 parts by weight of a glycidyl polyether of a polyhydric phenol having a vic-epoxy equivalency greater than one and (2) 1 part to 50 parts by weight of glycidyl 3,4-dihydro-1,2-pyran-2-carboxylate.

11. A composition as in claim 5 wherein the liquid material containning the cyclic structure is glycidyl 3,4-dihydro-1,2-pyran-2-methyl ether.

12. A composition consisting essentially of (1) 99 parts to 50 parts by weight of a glycidyl polyether of a polyhydric phenol having a vic-epoxy equivalency greater than 1 and (2) 1 part to 50 parts by weight of 3,4-dihydro-1,2-pyran-2-methyl 2,3-epoxypropionate.

13. An insoluble infusible product obtained by heating the composition defined in claim 1 with a curing agent for an epoxy resin.

14. An insoluble infusible product obtained by heating the composition defined in claim 1 with an amine curing agent.

15. An insoluble infusible product obtained by heating the composition defined in claim 1 with an acid anhydride curing agent.

16. An insoluble infusible product obtained by heating the composition of claim 5 with meta-phenylene diamine.

17. An insoluble infusible product obtained by heating the composition of claim 5 with diethylene triamine.

References Cited by the Examiner

UNITED STATES PATENTS

| | | | |
|---|---|---|---|
| 2,735,829 | 2/1956 | Wiles et al. | 260—30.4 |
| 2,786,853 | 3/1957 | Stansbury et al. | 260—88.3 |
| 2,801,229 | 7/1957 | De Hoff et al. | 260—30.4 |
| 2,993,014 | 7/1961 | Schardt | 260—30.4 |
| 3,016,362 | 1/1962 | Wismer | 260—42 |
| 3,046,246 | 7/1962 | Muskat | 260—30.4 |
| 3,072,606 | 1/1963 | Zuppinger et al. | 260—30.4 |
| 3,072,607 | 1/1963 | Fisch et al. | 260—30.4 |
| 3,074,973 | 1/1963 | Phillips et al. | 260—30.4 |
| 3,077,461 | 2/1963 | Hood et al. | 260—30.4 |
| 3,080,341 | 3/1963 | Chenicek et al. | 260—30.4 |
| 3,100,756 | 8/1963 | Fry et al. | 260—30.4 |
| 3,116,301 | 12/1963 | Williams et al. | 260—30.4 |

MORRIS LIEBMAN, *Primary Examiner.*